(12) United States Patent
Aziz (10) Patent No.: US 11,421,420 B2
(45) Date of Patent: Aug. 23, 2022

(54) GUTTER DOWNSPOUT EXTENSION GROUND SUPPORT

(71) Applicant: Amar Aziz, Calgary (CA)

(72) Inventor: Amar Aziz, Calgary (CA)

( * ) Notice: Subject to any disclaimer, the term of this patent is extended or adjusted under 35 U.S.C. 154(b) by 493 days.

(21) Appl. No.: 16/533,886

(22) Filed: Aug. 7, 2019

(65) Prior Publication Data

US 2021/0040744 A1 Feb. 11, 2021

(51) Int. Cl.
*F16M 13/00* (2006.01)
*E04D 13/08* (2006.01)
*F16B 2/22* (2006.01)
*F16L 3/00* (2006.01)

(52) U.S. Cl.
CPC ........ *E04D 13/08* (2013.01); *E04D 2013/084* (2013.01); *E04D 2013/086* (2013.01); *F16B 2/22* (2013.01); *F16L 3/006* (2013.01)

(58) Field of Classification Search
None
See application file for complete search history.

(56) References Cited

U.S. PATENT DOCUMENTS

| | | | |
|---|---|---|---|
| 1,552,902 A * | 9/1925 | Werner | F16L 55/24 210/446 |
| 1,711,240 A | 4/1929 | Merryweather | |
| 1,782,497 A * | 11/1930 | Anderson | A01K 80/00 37/316 |
| 2,603,440 A * | 7/1952 | Le Vesconte | A47G 23/0225 248/156 |
| 3,021,102 A * | 2/1962 | Kuempel | E04D 13/08 248/80 |
| 4,161,302 A * | 7/1979 | Stuhlman | E04D 13/08 248/156 |
| 4,440,370 A * | 4/1984 | Rood | B05B 15/622 248/75 |
| D342,016 S | 12/1993 | Zieglemann | |
| 5,437,424 A | 8/1995 | Netz, Sr. | |
| 5,452,743 A * | 9/1995 | Rortvedt | E04D 13/08 52/16 |
| 5,547,422 A * | 8/1996 | Seboldt | F24F 13/08 34/235 |
| 5,640,801 A * | 6/1997 | Rynberk | A01G 9/28 47/33 |
| 5,931,118 A * | 8/1999 | Thompson | A01K 45/002 52/16 |

(Continued)

FOREIGN PATENT DOCUMENTS

CA 2854781 12/2014

*Primary Examiner* — Amy J. Sterling
(74) *Attorney, Agent, or Firm* — Lewellyn Law, PLLC; Stephen Lewellyn (57) ABSTRACT

A gutter downspout extension support is used to support the free end of a downspout extension above the ground. The gutter downspout extension support has a clip with a first and second connected legs that are disposed overlapping and at a spaced distance from one another thereby providing a narrow gap therebetween that is configured to removably receive in a friction fit a bottom wall of the downspout extension. A ground engaging support stake having a first end and a tapered second end and a pivot coupling connecting the first end of the ground engaging support stake to the clip such that the ground engaging support stake is pivotable toward and away from the clip.

8 Claims, 6 Drawing Sheets

(56) References Cited

U.S. PATENT DOCUMENTS

| | | | |
|---|---|---|---|
| D723,356 S | 3/2015 | Simon | |
| 9,399,849 B2 * | 7/2016 | Langenderfer | E02D 27/50 |
| 10,184,592 B1 | 1/2019 | Rosendahl | |
| 10,874,960 B2 * | 12/2020 | Wagener | B01D 29/445 |
| 2003/0014925 A1 * | 1/2003 | Cox | E04H 15/62 |
| | | | 52/156 |
| 2005/0160681 A1 | 7/2005 | Boelling | |
| 2008/0295418 A1 * | 12/2008 | Edell | E04D 13/08 |
| | | | 52/12 |
| 2014/0284433 A1 | 9/2014 | Gazlay | |
| 2015/0041612 A1 * | 2/2015 | Kaplan | E04H 15/62 |
| | | | 248/508 |

\* cited by examiner

GUTTER DOWNSPOUT EXTENSION GROUND SUPPORT

FIELD OF THE INVENTION

The present invention relates to gutter downspout extensions and, more particularly, pertains to devices for supporting extensions above the ground.

BACKGROUND OF THE INVENTION

Gutters are located around the periphery of a roof of a structure to catch water as it drains off the roof. These gutters drain the water towards downspouts that carry the water off the structure and down to a desired drainage location near the bottom of the downspout. These downspouts are tubular and aligned in a generally vertical orientation. At the bottom of the downspout it is often desirable to provide a lateral extension that extends transversely from the bottom of the downspout in order to drain the water at a distance from the building.

The lateral extensions are effective for draining water away from the structure, but they suffer from problems. One example problem is they are prone to being kicked or otherwise hit by people, equipment, or animals. Another problem is the extensions when resting on the underlying ground can cause damage to the underlying grass. Yet another problem is in cold climates, the extensions can become frozen to the underlying ground.

Existing devices for supporting downspout extensions suffer from many drawbacks. For example, permanently installed devices not effective because it is often desired to move the extension to mow or to use the space where it extends when it is not raining. Existing movable devices designed suffer from breaking from striking by lawn equipment and people walking in the space where the extension is located.

Accordingly, there is a need and a desire for a new extension support device to support the extension above the ground, that is durable, easy to use, securely retains the extensions, and that overcomes forgoing described drawbacks and other inherent drawbacks found in existing devices.

SUMMARY OF THE INVENTION

Embodiments of the invention provide a new gutter downspout extension support that overcomes the disadvantages of the now existing devices for retaining and supporting downspout extensions.

An object of embodiments of the present invention is to provide gutter downspout extension support that is easy to use and maintain the extension at a desired height above the ground.

Another object of embodiments of the present invention is to provide gutter downspout extension support that has a pivoting, ground-engaging support stake that is movable out of the way of lawn equipment or while not in use.

Another object of embodiments of the present invention is to provide gutter downspout extension support that prevents damage or marks on the underlying grass.

Another object of embodiments of the present invention is to provide gutter downspout extension support that is easy to install and remove by a clip that removably secures to the open end of the extension.

In general, in one aspect, a gutter downspout extension support is provided that includes a clip having a first and second connected legs that are disposed overlapping and at a spaced distance from one another thereby providing a narrow gap therebetween that is configured to removably receive in a friction fit a bottom wall of a downspout extension. A ground engaging support stake having a first end and a tapered second end and a pivot coupling connecting the first end of the ground engaging support stake to the clip such that the ground engaging support stake is pivotable toward and away from the clip.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Initially, with reference to FIGS. 1 through 5 of the drawings, reference number 10 generally designates gutter downspout extension ground support 10 in accordance with an embodiment of the invention. Support 10 secured to and supports the end of a downspout extension 12 above the ground 14. Support 10 includes a clip 16 configured for removable attachment to the end of the extension 12 and a support stake 18 for engaging the ground 14 below the extension and supporting the end of the extension above the ground. The support 10 can be constructed of many different materials, including plastics and metals. If constructed of metals, preferably the metals are corrosion resistant and/or coated or painted to prevent corrosion or rusting.

Figure 1:
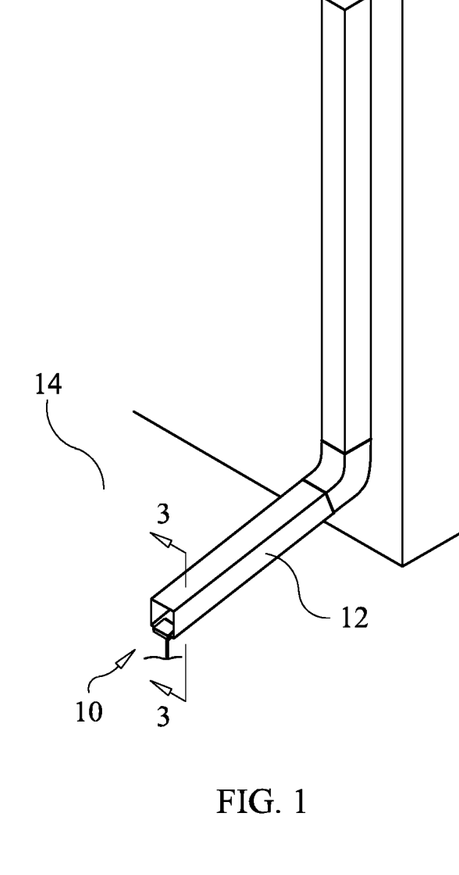
FIG. 1 is a perspective view of a gutter downspout extension support in accordance with an embodiment of the invention, shown in use attached to and supporting the free end of a downspout extension above the ground.
Figure 2:
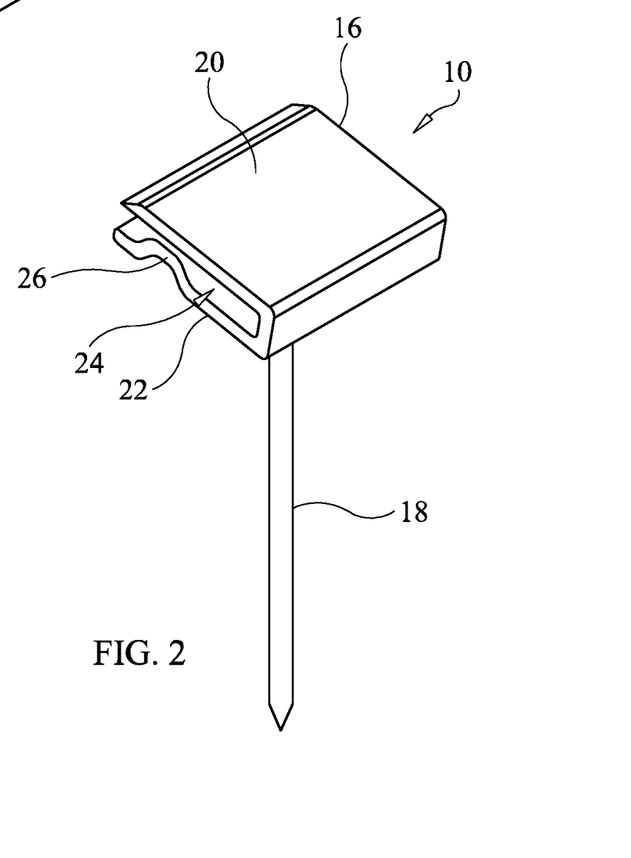
FIG. 2 is a perspective view of a gutter downspout extension support in accordance with an embodiment of the invention.
Figure 3:
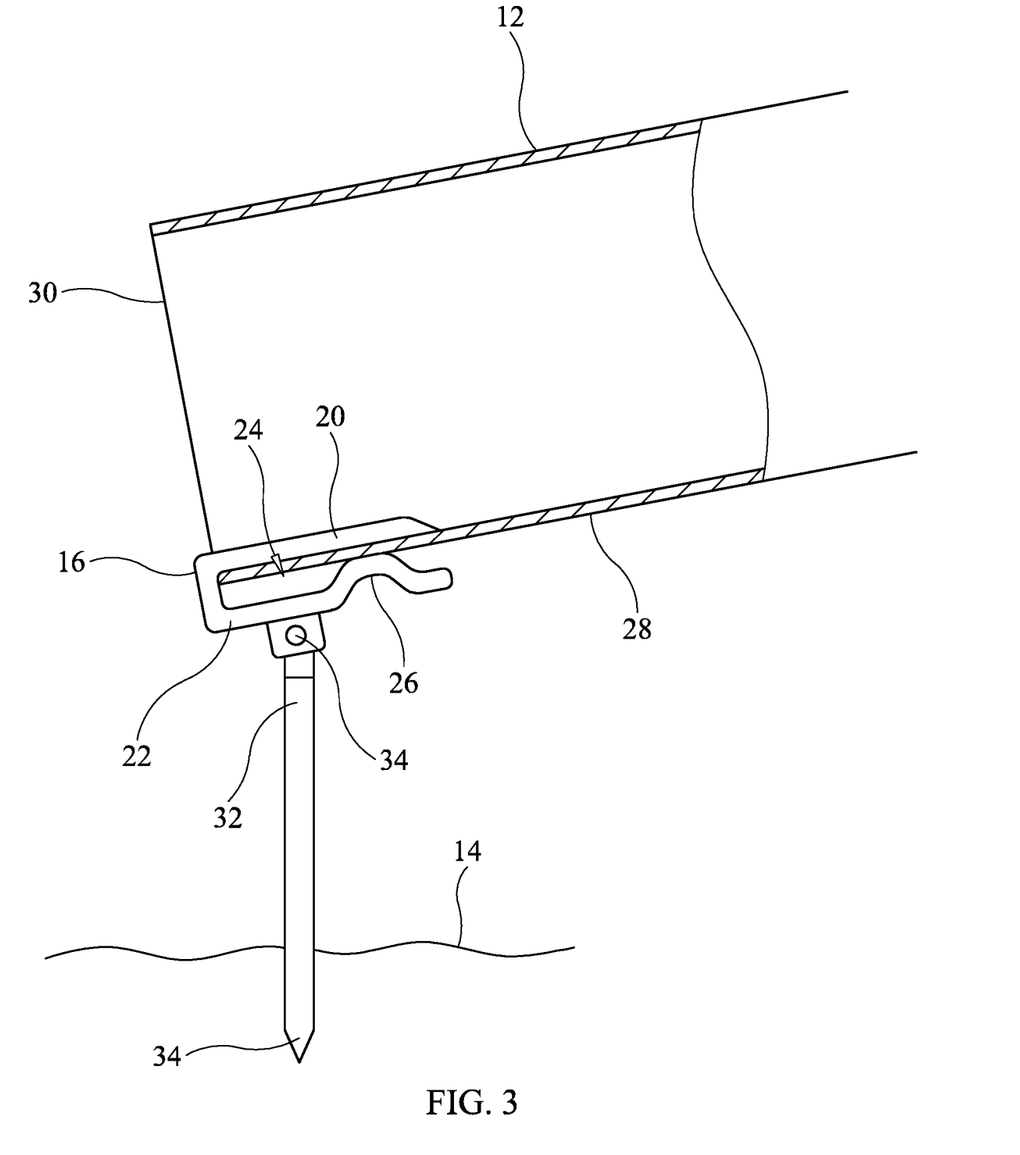
FIG. 3 is a cross-sectional view taken along line 3-3 in FIG. 1, illustrating a gutter downspout extension support in accordance with an embodiment of the invention and in use in connection with the downspout extension.
Figure 4:
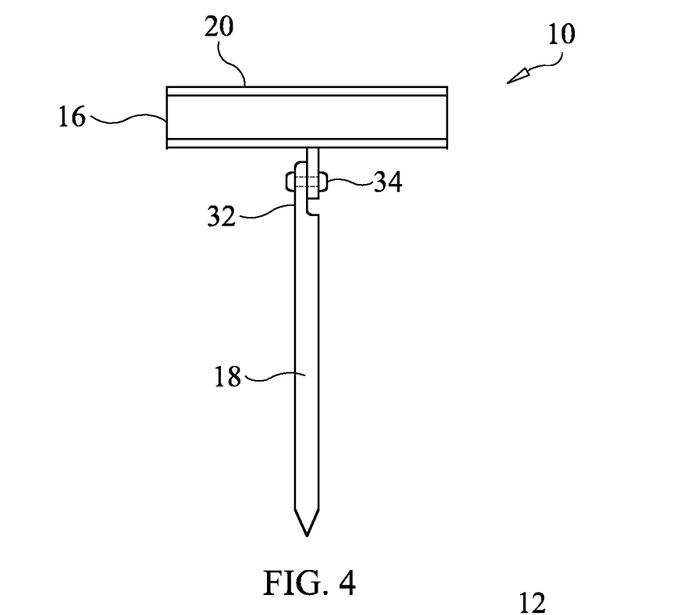
FIG. 4 is a front view of a gutter downspout extension support in accordance with an embodiment of the invention.

Clip 16 includes a first planar leg 20 and a second planar leg 22 that are connected such that the legs are disposed overlapping and at a spaced distance from one another thereby providing a narrow gap 24 therebetween. The second leg 22 has an inwardly directed curvature 26 formed therein that extends transversely along the width thereof. The clip 16 is attached to the end 30 of the extension 12 by inserting the bottom wall 28 of the extension 12 into the gap 24 wherein the bottom wall is pinched between the first and second legs 20 and 22 of the clip, thereby removably securing the support 10 to the extension. The first and second legs 20 and 22 have a resiliency allowing the legs to slightly separate upon inserting the bottom wall 28 into the gap 24 thereby providing the pinching or friction force upon the bottom wall to secure the clip in place. In this representatively illustrated embodiment, the width of the clip 16 is less than the width of the bottom wall 28 of the extension 12.

Figure 5:
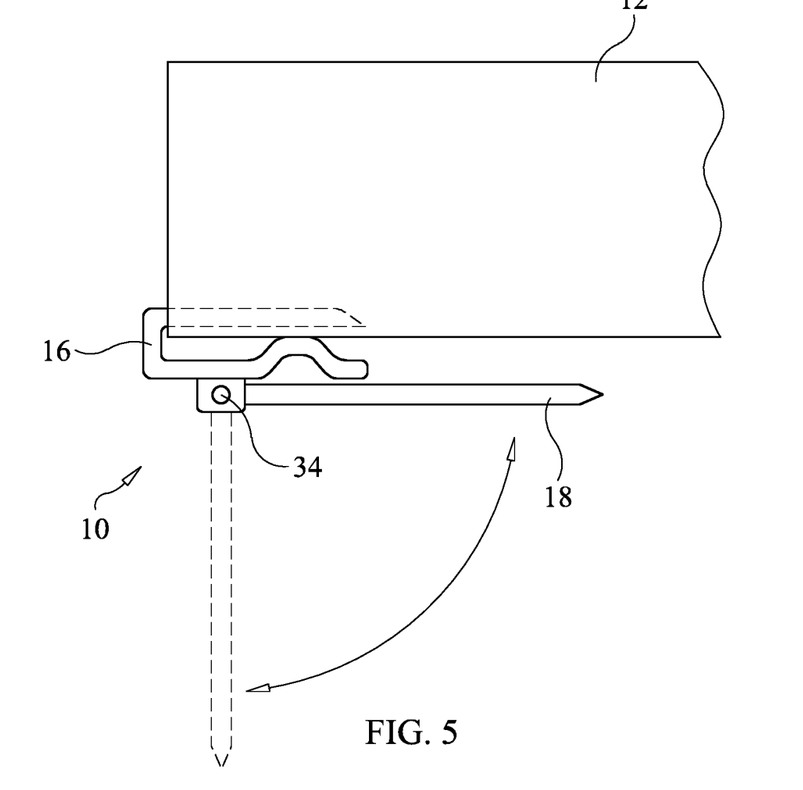
FIG. 5 is a side view of a gutter downspout extension support in accordance with an embodiment of the invention, showing the support in use with a downspout extension with a ground engaging stake in a folded, storage position.

Support stake 18 is pivotally attached at end 32 thereof to the second leg 22 of the clip 16 by pivot coupling 34. Pivot coupling 34 allows the stake 18 to rotate relative to the clip 16, which provides two functions. First, it allows the stake 18 to be oriented generally vertically when engage with the ground 14 regardless of steep the extension 12 is relative to the ground. Second, it allows the stake 18 to be folded in a direction against the extension 12, thereby moving the stake out of the way of lawn equipment or for storage purposes, as best seen in FIG. 5. The opposite end 34 of the support stake 18 is tapered to allow the stake to be inserted a desire depth into the ground 14. In this manner, the end 30 of the extension 12 is secured in place to and above the ground 14.

Figure 6:
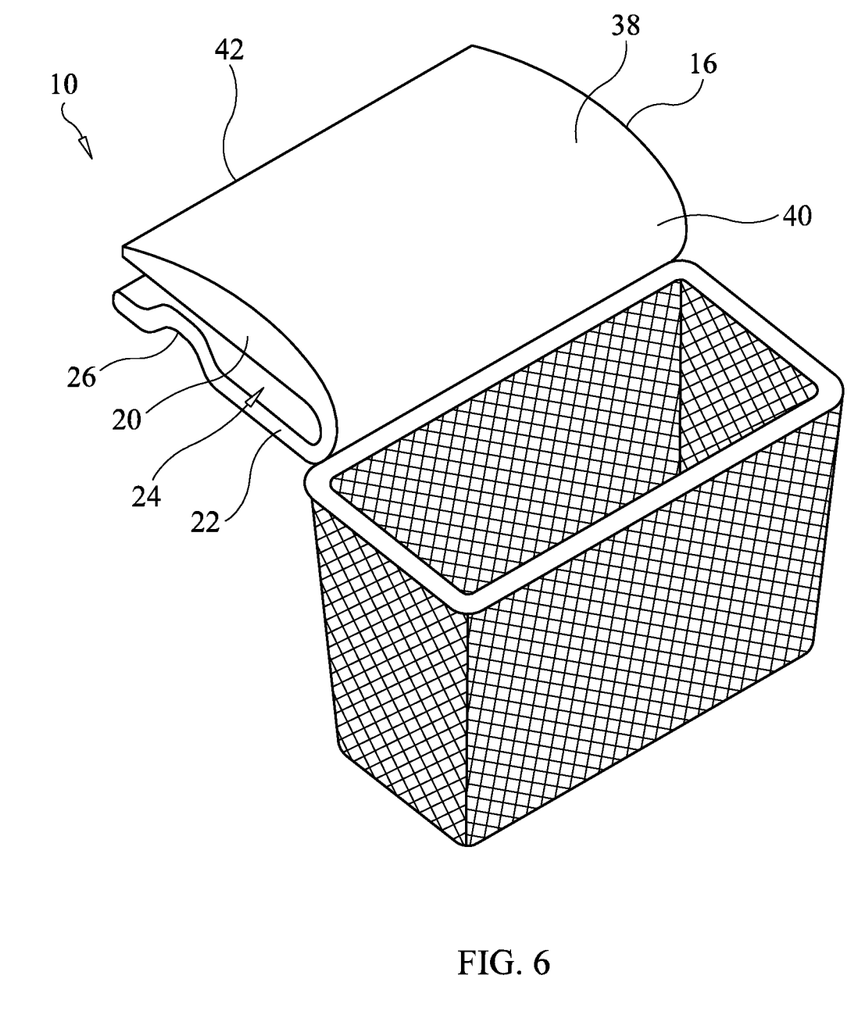
FIG. 6 is a perspective view of a gutter downspout extension support in accordance with an alternative embodiment of the invention.
Figure 7:
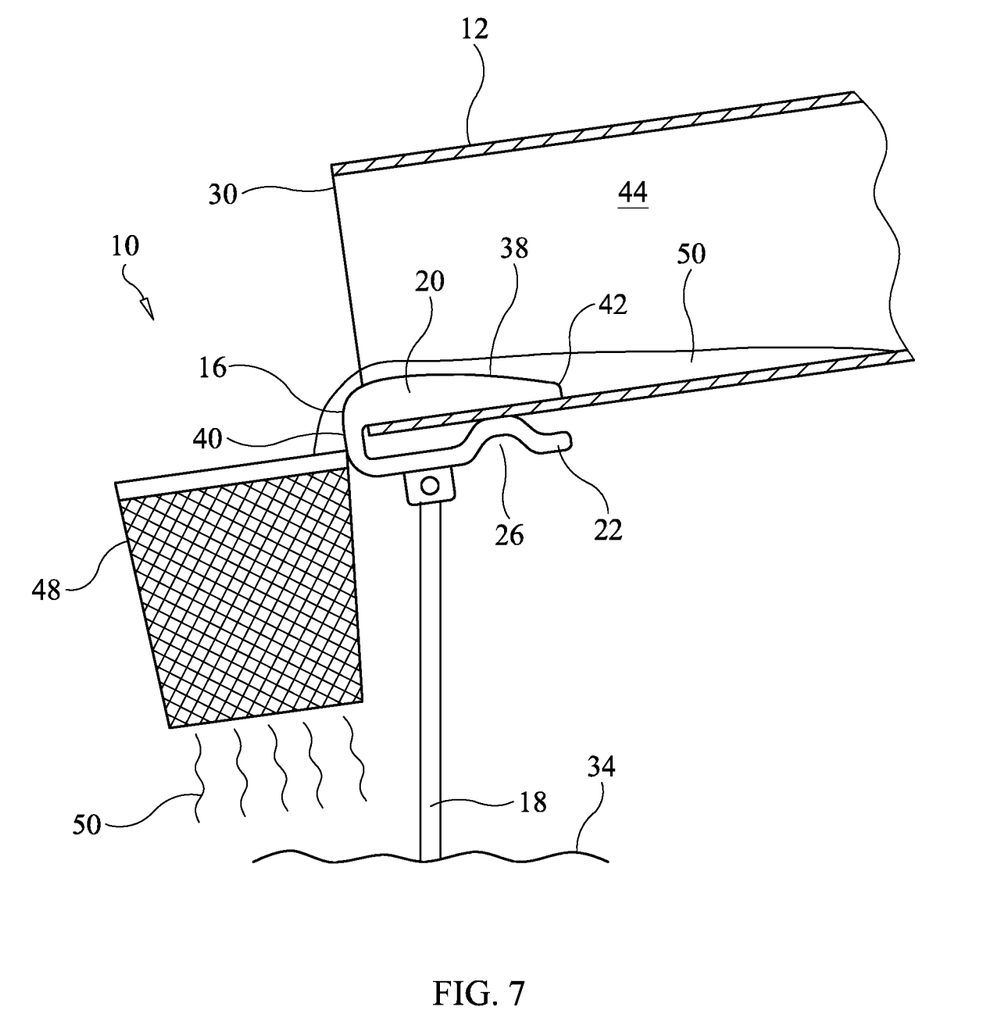
FIG. 7 is a cross-sectional, side view illustrating the gutter downspout extension support of FIG. 6 in use in connection with the downspout extension.
Figure 8:
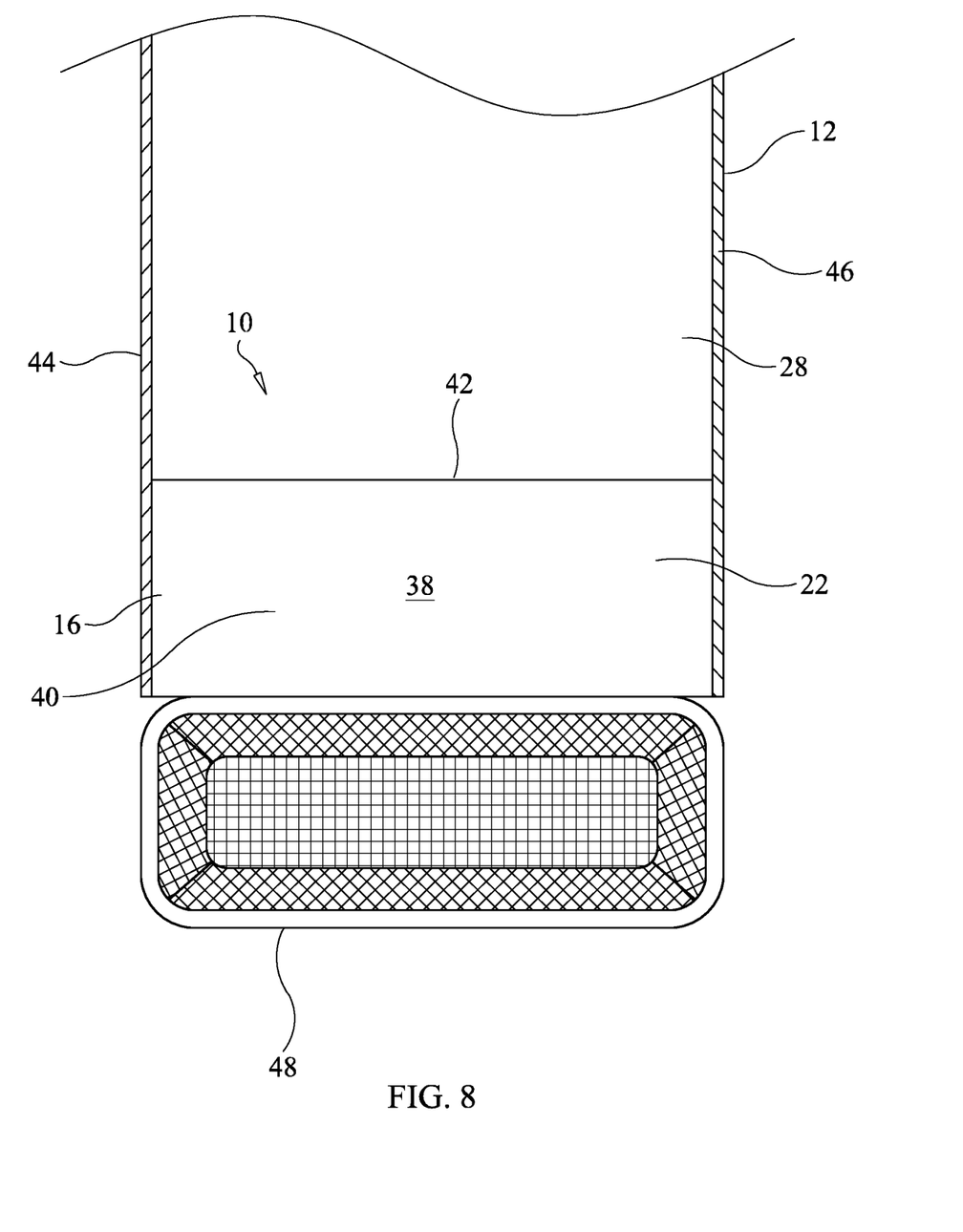
FIG. 8 is a top cross-sectional, side view illustrating the gutter downspout extension support of FIG. 6 in use in connection with the downspout extension.

In FIGS. 6 through 8, support 10 is shown with another alternative configuration. Particularly, the outward face 38 of the first leg 20 has a convex curvature that tapers from wide to narrow in a direction from the front end 40 toward the back end 42 of thereof. In this representatively illustrated embodiment, at least the first leg 20 of the clip has a width that is substantially equal to the width of the bottom wall 28 of the extension 12 such that leg 20 extends along substantially across the entire width of the bottom wall 28 between opposite side walls 44 and 46 of the extension when the clip is secured to the end 30 of the extension.

Further, in this illustrated embodiment, the support 10 further includes a rectangular shaped basket 48 attached to the clip 16 at the front end 40 thereof such that the long side of the basket extends along the width of at least the first leg 20. The basket 48 is formed of a mesh material that allows water to easily pass therethrough. In this configuration, as best seen in FIG. 8, the convex curvature of the outward face 38 of the first leg 20 operates as a weir to raise the level of water 50 flowing through the extension 12 so that the water disperses across the width of the first leg as it flows out of the extension. Water 50 flowing out of the extension 12 is directed into and through the mesh basket 48 thereby removing debris carried in the water before reaching the ground 14.

While the invention has been particularly shown and described with respect to the illustrated embodiments thereof, it will be understood by those skilled in the art that the foregoing and other changes in form and details may be made therein without departing from the spirit and scope of the invention.

What is claimed is:

1. A gutter downspout extension ground support comprising:
    a clip having a first and second connected legs that are disposed overlapping and at a spaced distance from one another thereby providing a narrow gap therebetween that is configured to removably receive in a friction fit a bottom wall of a downspout extension;
    a ground engaging support stake having a first end and a tapered second end;
    a pivot coupling connecting the first end of said ground engaging support stake to said clip such that said ground engaging support stake is pivotable toward and away from said clip; and
    a basket of mesh material attached to a front end of said clip.

2. The gutter downspout extension ground support of claim 1, wherein said basket extends along the width of said clip.

3. The gutter downspout extension ground support of claim 1, wherein said basket is rectangular shaped.

4. The gutter downspout extension ground support of claim 1, wherein said second leg of said clip has an inwardly directed curvature formed therein that extends transversely along the width thereof.

5. The gutter downspout extension ground support of claim 1, wherein said first leg of said clip having a width that is substantially equal to the width of a bottom wall of a downspout extension such that said first leg extends substantially across the entire width of the bottom wall between opposite side walls of the downspout extension when said clip is secured to said downspout extension with the bottom wall thereof disposed within said gap.

6. The gutter downspout extension ground support of claim 1, wherein an outward face of said first leg has a convex curvature that tapers from wide to narrow in a direction from a front end of said first leg toward a back end of said first leg.

7. A gutter downspout extension ground support comprising:
    a clip having a first and second connected legs that are disposed overlapping and at a spaced distance from one another thereby providing a narrow gap therebetween that is configured to removably receive in a friction fit a bottom wall of a downspout extension, wherein said second leg of said clip has an inwardly directed curvature formed therein that extends transversely along the width thereof, wherein said first leg of said clip having a width that is substantially equal to the width of a bottom wall of a downspout extension such that said first leg extends substantially across the entire width of the bottom wall between opposite side walls of the downspout extension when said clip is secured to said downspout extension with the bottom wall thereof disposed within said gap;

a ground engaging support stake having a first end and a tapered second end;

a pivot coupling connecting the first end of said ground engaging support stake to said clip such that said ground engaging support stake is pivotable toward and away from said clip; and a basket of mesh material attached to a front end of said clip, wherein said basket extends along the width of said clip.

8. The gutter downspout extension ground support of claim 7, wherein said basket is rectangular shaped.

* * * * *